(12) United States Patent
Hwang et al.

(10) Patent No.: US 12,400,123 B2
(45) Date of Patent: Aug. 26, 2025

(54) METHOD AND SYSTEM FOR CONTROLLING A VEHICLE USING MACHINE LEARNING

(71) Applicants: HYUNDAI MOTOR COMPANY, Seoul (KR); KIA CORPORATION, Seoul (KR); Kookmin University Industry Academy Cooperation Foundation, Seoul (KR)

(72) Inventors: Kyung Hun Hwang, Suwon-si (KR); Joong Hoo Park, Suwon-si (KR); Hyeon Goo Pyeon, Dongducheon-si (KR); Se Joon Lim, Seoul (KR); Hee Jung Kim, Seoul (KR)

(73) Assignees: HYUNDAI MOTOR COMPANY, Seoul (KR); KIA CORPORATION, Seoul (KR); Kookmin University Industry Academy Cooperation Foundation, Seoul (KR)

( * ) Notice: Subject to any disclaimer, the term of this patent is extended or adjusted under 35 U.S.C. 154(b) by 197 days.

(21) Appl. No.: 18/100,684

(22) Filed: Jan. 24, 2023

(65) Prior Publication Data
US 2024/0075943 A1  Mar. 7, 2024

(30) Foreign Application Priority Data

Sep. 1, 2022  (KR) ........................ 10-2022-0110801

(51) Int. Cl.
*G06N 3/092* (2023.01)
*B60W 40/09* (2012.01)
(Continued)

(52) U.S. Cl.
CPC ............. *G06N 3/092* (2023.01); *B60W 40/09* (2013.01); *B60W 40/105* (2013.01);
(Continued)

(58) Field of Classification Search
CPC ............ G06N 3/08; G06N 3/02; G06N 20/00; G06N 3/045; B60W 10/04; B60W 10/06; B60W 2540/10; B60W 10/18
(Continued)

(56) References Cited

U.S. PATENT DOCUMENTS 4,976,239 A * 12/1990 Hosaka ................. F02D 11/105
123/436
10,046,757 B2  8/2018 Park
(Continued)

FOREIGN PATENT DOCUMENTS

JP  2014115168 A  6/2014
JP  2021128510 A  9/2021
(Continued)

*Primary Examiner* — Phutthiwat Wongwian
*Assistant Examiner* — Brian R Kirby
(74) *Attorney, Agent, or Firm* — Lempia Summerfield Katz LLC

(57) ABSTRACT

A method for controlling a vehicle includes: determining an accelerator position sensor/brake pedal position sensor (APS/BPS) command value based on a state variable and a reward variable including a prediction value for a future velocity of the vehicle predicted based on a past APS/BPS command value of the vehicle; and learning for a reward value according to the reward variable to satisfy a predetermined goal based on a change that the determined APS/BPS command value causes to at least one state variable under given environment information.

20 Claims, 14 Drawing Sheets

(51) Int. Cl.
  *B60W 40/105* (2012.01)
  *B60W 50/00* (2006.01)
  *B60W 50/10* (2012.01)

(52) U.S. Cl.
  CPC ........ *B60W 50/0097* (2013.01); *B60W 50/10* (2013.01); *B60W 2510/0638* (2013.01); *B60W 2540/10* (2013.01); *B60W 2540/12* (2013.01)

(58) Field of Classification Search
  USPC .................................. 701/22, 23, 59; 706/21
  See application file for complete search history.

(56) References Cited

U.S. PATENT DOCUMENTS

| | | | |
|---|---|---|---|
| 11,328,219 B2 | 5/2022 | Zhang et al. | |
| 2009/0306866 A1* | 12/2009 | Malikopoulos ... | B60W 30/1882 701/59 |
| 2011/0187522 A1* | 8/2011 | Filev ................. | B60W 50/16 340/441 |
| 2015/0047602 A1* | 2/2015 | Shao ................. | F02D 11/02 123/344 |
| 2016/0082862 A1* | 3/2016 | Cho .................. | B60L 15/2045 903/906 |
| 2017/0045138 A1* | 2/2017 | Jeong ................ | F16H 61/06 |
| 2017/0080923 A1* | 3/2017 | Johri ................. | B60W 10/06 |
| 2017/0217424 A1 | 8/2017 | Park | |
| 2019/0072960 A1* | 3/2019 | Lin ................... | B60W 40/09 |
| 2019/0146514 A1 | 5/2019 | Son | |
| 2019/0344793 A1* | 11/2019 | Frerichs ........... | B60W 30/18072 |
| 2020/0031347 A1* | 1/2020 | Shenker ............ | F02D 41/2432 |
| 2020/0031371 A1* | 1/2020 | Soliman ............ | B60W 10/04 |
| 2020/0158750 A1* | 5/2020 | Zhou ................. | B60W 60/0027 |
| 2020/0174471 A1* | 6/2020 | Du .................... | H04W 4/44 |
| 2021/0001860 A1* | 1/2021 | Kawasaki .......... | B60W 30/09 |
| 2021/0115834 A1* | 4/2021 | Hashimoto ........ | G06N 20/00 |
| 2021/0179062 A1* | 6/2021 | Lee ................... | B60W 10/08 |
| 2021/0237773 A1* | 8/2021 | Hashimoto ........ | B60W 10/02 |
| 2021/0254571 A1* | 8/2021 | Hashimoto ........ | F02D 41/2422 |
| 2022/0143823 A1* | 5/2022 | Yoshida ............ | G06N 3/088 |

FOREIGN PATENT DOCUMENTS

| | | |
|---|---|---|
| KR | 101765635 B1 | 8/2017 |
| KR | 20190054389 A | 5/2019 |
| KR | 20210090313 A | 7/2021 |
| KR | 20210090386 A | 7/2021 |
| KR | 20220163751 A | 12/2022 |

\* cited by examiner

METHOD AND SYSTEM FOR CONTROLLING A VEHICLE USING MACHINE LEARNING

CROSS REFERENCE TO RELATED APPLICATION

The present application claims priority to and the benefit of Korean Patent Application No. 10-2022-0110801, filed on Sep. 1, 2022, the entire contents of which are incorporated herein by this reference.

FIELD

The present disclosure relates to autonomous driving technology, and more particularly, to a technology for learning a driver model using machine learning and controlling a vehicle by using the driver model.

BACKGROUND

Artificial intelligence is a 'problem-solving function'. Most decision-making by people, such as what to wear and what to say, is a kind of problem-solving process. Artificial intelligence has been evolving from simple problem-solving to practical intelligence implementation through technological changes.

In order to evaluate the performance and fuel efficiency of a vehicle, a vehicle velocity profile prescribed in the chassis dynamometer is typically used. In chassis dynamometers, tests are typically performed by the driver operating the accelerator and brake pedals. However, tests in which a human driver directly operates the pedals lack reproducibility, and a robot driver is sometimes used to compensate for the lack of reproducibility. In the case of using such a robot driver, the test deviation is so much reduced compared to the test driver as to allow performing the vehicle's fuel economy and drivability development tasks efficiently. However, such robot drivers have drawbacks in terms of high purchase prices, installation difficulty, and the like.

In order to address the drawbacks of the robot driver, a vehicle test system named Virtual & Robot Driver was developed to perform tests by controlling the vehicle based on command values of Controller Area Network (CAN) and Accelerator Position Sensor (APS). This system was implemented with a proportional-integral-differential (PID) control technique and compensated for various shortcomings of the existing robot driver.

However, in order to drive the vehicle velocity profile through the corresponding system, it is necessary to set the control variable value (PID gain value) required in the PID control method. These control variable values should be set differently for each evaluation mode (e.g., FTP-45, HWFET, NEDC, etc.) and each vehicle. For this reason, the process of tuning control variables of the Virtual & Robot Driver is typically very time consuming. A model has been developed to find appropriate proportional (P) and integral (I) gain values for each vehicle using machine learning techniques, but it is difficult to overcome the shortcomings of PI controllers that cannot provide optimal results in all sections and require the model to be newly trained for each evaluation mode and vehicle.

The foregoing is intended merely to aid in the understanding of the background of the present disclosure, and is not intended to mean that the present disclosure falls within the purview of the related art that is already known to those having ordinary skill in the art.

SUMMARY

It is a technical object of the present disclosure to provide a driver model automatic learning algorithm capable of outputting optimal APS and BPS values according to mode fuel economy test evaluation modes (e.g., FTP-45, HWFET, and NEDC).

It is another technical object of the present disclosure to implement a control logic capable of flexibly responding to changes in environment and conditions through machine learning using various data such as acceleration, control variable, velocity, and target velocity.

It is still another technical object of the present disclosure to shorten the mass production period and improve test safety by reducing the manpower input during vehicle performance development.

A method for controlling a vehicle according to an embodiment of the present disclosure includes: determining an accelerator position sensor/brake pedal position sensor (APS/BPS) command value based on a state variable and a reward variable comprising a prediction value for a future velocity of the vehicle predicted based on a past APS/BPS command value of the vehicle; and learning for a reward value according to the reward variable to satisfy a predetermined goal based on a change that the determined APS/BPS command value causes to at least one state variable under given environment information.

In an aspect, the reward variable may include an index determining a relative ratio contributing to satisfying the predetermined goal between an error of a current velocity and an error of the future velocity.

In an aspect, the control method may further include generating the APS/BPS command value for following a predetermined velocity profile with a driver agent to which a result of learning is applied and controlling a power device of the vehicle based on the APS/BPS command value.

In an aspect, determining the APS/BPS command value may further include determining an APS/BPS variation based on the state variable and the reward variable and determining the APS/BPS command value based on the APS/BPS variation and the APS/BPS command value at a time point ahead of a predetermined time from a current time point.

In an aspect, the prediction value for the future velocity of the vehicle may be determined based on past velocity information of the vehicle corresponding to at least two different time points.

In an aspect, the prediction value for the future velocity of the vehicle may be determined based on i) a value obtained by passing past acceleration information of the vehicle through a low pass filter and ii) the current velocity of the vehicle.

In an aspect, the past APS/BPS command value may be a past APS/BPS command value for a predetermined period.

In an aspect, the prediction value for the future velocity may include a prediction value for the future velocity during a predetermined period.

In an aspect, the state variable may include at least one of a past velocity of the vehicle, an error of an actual velocity with respect to a past target velocity of the vehicle, or a target velocity of the vehicle.

In an aspect, the target velocity of the vehicle may have different values depending on a driving mode of the vehicle.

In an aspect, the reward variable of the vehicle may be determined based on an aggression index, a root mean square error of a past driving velocity and past target velocity of the vehicle, a root mean square error of a predicted future velocity and future target velocity of the vehicle, and the signal penalty.

In an aspect, the larger the value of the aggression is, the more aggressive the driving pattern may be.

In an aspect, the signal penalty may have a positive value when the APS/BPS command value generated by the vehicle is lower than the APS/BPS command value for maintaining the vehicle at a constant velocity in a situation where the vehicle is accelerating.

In another embodiment, a system for controlling a vehicle according to an embodiment of the present disclosure includes: a vehicle velocity predictor configured to generate a prediction value for a future velocity predicted based on a past accelerator position sensor/brake pedal position sensor (APS/BPS) command value of the vehicle; and an agent implementation unit configured to determine an APS/BPS command value based on at least one of a state variable and a reward variable, and learn for a reward value according to the reward variable to satisfy a predetermined goal based on a change that the determined APS/BPS command value causes to at least one state variable under given environment information.

In an aspect, the APS/BPS command value may be generated for following a predetermined velocity profile with a driver agent to which a result of learning is applied, and the system may further include a power device controlled based on the APS/BPS command value.

In an aspect, the agent implementation unit may be configured to determine an APS/BPS variation based on the state variable and the reward variable, and determine the APS/BPS command value based on the APS/BPS variation and the APS/BPS command value at a time point ahead of a predetermined time from a current time point.

In an aspect, the prediction value for the future velocity of the vehicle may be determined based on past velocity information of the vehicle corresponding to at least two different time points.

In an aspect, the prediction value for the future velocity of the vehicle may be determined based on i) a value obtained by passing past acceleration information of the vehicle through a low pass filter and ii) a current velocity of the vehicle.

In an aspect, the past APS/BPS command value may be a past APS/BPS command value for a predetermined period.

In an aspect, the prediction value for the future velocity may include a prediction value for the future velocity for a predetermined period.

In an aspect, the state variable may further include at least one of the past velocity of the vehicle, an error of an actual velocity with respect to the past target velocity of the vehicle, a target velocity of the vehicle.

In an aspect, the target velocity of the vehicle may have a different value according to the driving mode of the vehicle.

In an aspect, the reward variable of the vehicle may be determined based on an aggression index, a root mean square error of the past driving velocity and a past target velocity of the vehicle, a root mean square error of the predicted a future velocity and future target velocity of the vehicle, and a signal penalty.

In an aspect, the larger the value of the aggression index is, the more aggressive the driving pattern may be.

In an aspect, the signal penalty may have a positive value when the APS/BPS command value generated by the vehicle is lower than the APS/BPS command value for maintaining the vehicle at a constant velocity in a situation where the vehicle is accelerating.

According to embodiments of the present disclosure, a driver model automatic learning algorithm capable of outputting optimal APS and BPS values according to mode fuel economy test evaluation modes (e.g., FTP-45, HWFET, and NEDC) may be provided.

According to embodiments of the present disclosure, a control logic capable of flexibly responding to changes in environment and conditions through machine learning using various data such as acceleration, control variable, velocity, and target velocity, may be provided.

According to embodiments of the present disclosure, the mass production period and improve test safety may be shortened by reducing the manpower input when developing vehicle performance.

According to embodiments of the present disclosure, different driving modes or different driving propensity models may be implemented according to the reward design used for agent learning.

BRIEF DESCRIPTION OF THE DRAWINGS

In order that the disclosure may be well understood, there are now described various forms thereof, given by way of example, reference being made to the accompanying drawings, in which.

DETAILED DESCRIPTION

Figure 1:
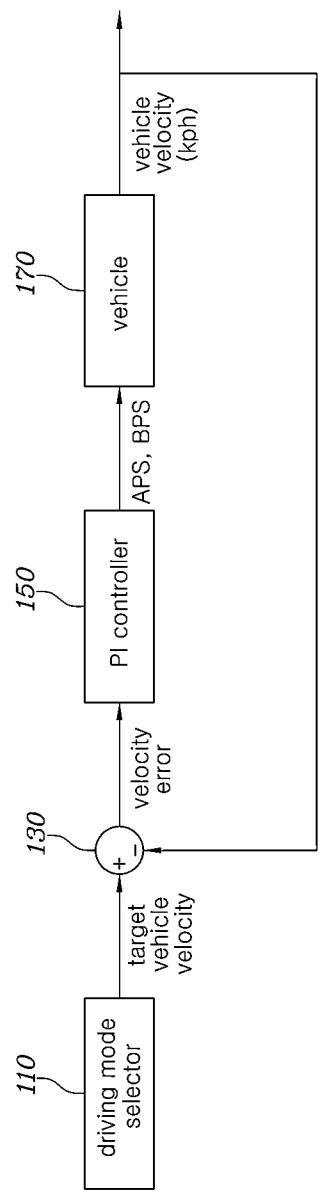
FIG. 1 is a control block diagram of a conventional Virtual & Robot Driver system.

Hereinafter, descriptions are made of the embodiments disclosed in the present specification with reference to the accompanying drawings in which the same reference numbers are assigned to refer to the same or like components and redundant description thereof is omitted. As used in the following description, the suffix "module" and "unit" are granted or used interchangeably in consideration of easiness of description but, by itself, having no distinct meaning or role. In addition, detailed descriptions of well-known technologies related to the embodiments disclosed in the present specification may be omitted to avoid obscuring the subject matter of the embodiments disclosed in the present specification. In addition, the accompanying drawings are only for easy understanding of the embodiments disclosed in the present specification and do not limit the technical sprit disclosed herein, and it should be understood that the embodiments include all changes, equivalents, and substitutes within the sprit and scope of the disclosure.

As used herein, terms including an ordinal number such as "first" and "second" can be used to describe various components without limiting the components. The terms are used only for distinguishing one component from another component.

It will be understood that when a component is referred to as being "connected to" or "coupled to" another component, it can be directly connected or coupled to the other component or intervening component may be present. In contrast, when a component is referred to as being "directly connected to" or "directly coupled to" another component, there are no intervening component present.

As used herein, the singular forms are intended to include the plural forms as well, unless the context clearly indicates otherwise.

It will be further understood that the terms "comprises", "includes", or "has," when used in this specification, specify the presence of a stated feature, number, step, operation, component, element, or a combination thereof, but they do not preclude the presence or addition of one or more other features, numbers, steps, operations, components, elements, or combinations thereof.

When a component, device, element, or the like of the present disclosure is described as having a purpose or performing an operation, function, or the like, the component, device, or element should be considered herein as being "configured to" meet that purpose or to perform that operation or function.

Throughout the specification, "vehicle velocity" is used to mean the velocity of the vehicle.

In order to perform driver evaluation with conventional mode fuel efficiency tests (e.g., FTP-45, HWFET, NEDC, etc.), the driver directly operates the accelerator and brake pedal in the vehicle placed on a chassis dynamometer, a device for use in measuring fuel efficiency/emission, to drive according to a predetermined vehicle velocity profile and then measure the amount of gas emitted and calculate the fuel economy. When the driver operates the accelerator pedal and the brake pedal, the accelerator position sensor (APS) and the brake pedal position sensor (BPS) respectively transmit a voltage signal corresponding to the pressure at which the pedal operates to the engine controller (ECU), the transmission controller (TCU), and the hybrid controller (HCU). However, even when the same driver repeatedly performs the test with the same vehicle velocity profile, there is bound to be a deviation between test results whenever the test is performed. In particular, in the case of distance to empty (DTE) of electric vehicles and eco-friendly vehicles that take a long time, the deviation is further increased due to the accumulation of driver fatigue. In order to solve this problem, a robot driver may be used.

However, such a robot driver has drawbacks in terms of high purchase price, installation difficulty, and the like. In order to address the drawbacks of the robot driver, a Virtual & Robot Driver-based evaluation was developed, the Virtual & Robot Driver controlling the vehicle based on the command values of Controller Area Network (CAN) and Accelerator Position Sensor (APS). The Virtual & Robot Driver-based evaluation system operates with a Proportional-Integral-Differential (PID) control technique.

FIG. 1 is a control block diagram of a conventional Virtual & Robot Driver system.

With reference to FIG. 1, a conventional Virtual & Robot Driver system includes a driving mode selector 110, a comparator 130, a PI controller 150, and a vehicle 170.

The driving mode selector 110 determines the target velocity of the vehicle 170 and transmits the determined target velocity to the comparator 130. Additionally, the vehicle 170 transmits current velocity information to the comparator 130. The comparator 130 determines a velocity error based on the difference between the current velocity of the vehicle 170 and the target velocity of the vehicle 170 and transmits the velocity error to the PI controller 150. The PI controller 150 generates command values for an accelerator position sensor (APS) and a brake pedal position sensor (BPS) based on the velocity error received from the comparator 130 and transmits the command values to the vehicle 170. The vehicle 170 is driven by controlling the engine based on the APS and BPS values received from the PI controller 150.

Such a conventional virtual and robot driver system has drawbacks in that the control variable, i.e., the PID gain value, must be modified every time for each vehicle, velocity profile, or test environment of the vehicle. In addition, it takes a long time to find a control variable appropriate for these various conditions. Further, it is difficult to follow the vehicle velocity profile with only one fixed control variable.

Hereinafter, a description is made of a vehicle control method and system capable of generating the APS and BPS values required for a mode fuel economy test evaluation mode (e.g., FTP-45, HWFET, NEDC, etc.) by using machine learning to solve above problems.

Figure 2:
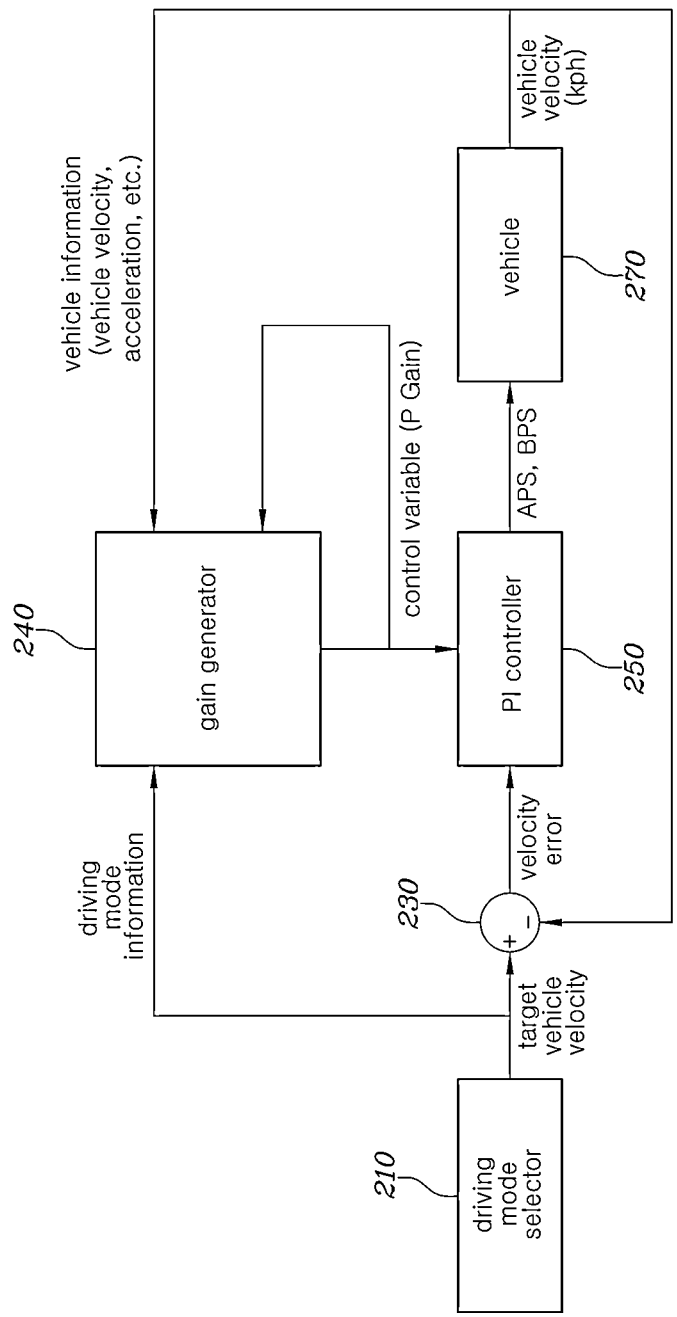
FIG. 2 is a control block diagram of a machine learning-based virtual and robot driver system, according to an embodiment of the present disclosure.

FIG. 2 is a block diagram of a machine learning-based virtual and robot driver system, according to an embodiment of the present disclosure.

With reference to FIG. 2, the virtual and robot driver system according to an embodiment includes a driving mode selector 210, a comparator 230, a gain generator 240, a PI controller 250, and a vehicle 270.

The driving mode selector 210 may determine the target velocity of the vehicle 270 and may transmit the determined target velocity to the comparator 230. Additionally, the vehicle 270 may transmit current velocity information to the comparator 230. The driving mode selector 210 may also determine the driving mode of the vehicle 270 and may transmit the determination result (sometimes referred to herein as "driving mode information") to the gain generator 240. Additionally, the vehicle 270 may transmit vehicle information to the gain generator 240.

In an aspect, the vehicle information may include at least one of a velocity or an acceleration of the vehicle 270.

The comparator 230 may determine a velocity error based on the difference between the current velocity and the target velocity of the vehicle 270 and may transmit the velocity error to the PI controller 250. The gain generator 240 may determine a control variable based on the driving mode information and the vehicle information and may transmit the control variable to the PI controller 250.

In an aspect, the control variable may include a P gain value.

The PI controller 250 may determine command values for the Accelerator Position Sensor (APS) and the Brake Pedal Position Sensor (BPS) based on the velocity error received from the comparator 230 and the control variable received from the gain generator 240, and may transmit the APS and the BPS command values to the vehicle 270. The vehicle 270 may operate by controlling the engine based on the APS and BPS command values received from the PI controller 250.

Figure 3:
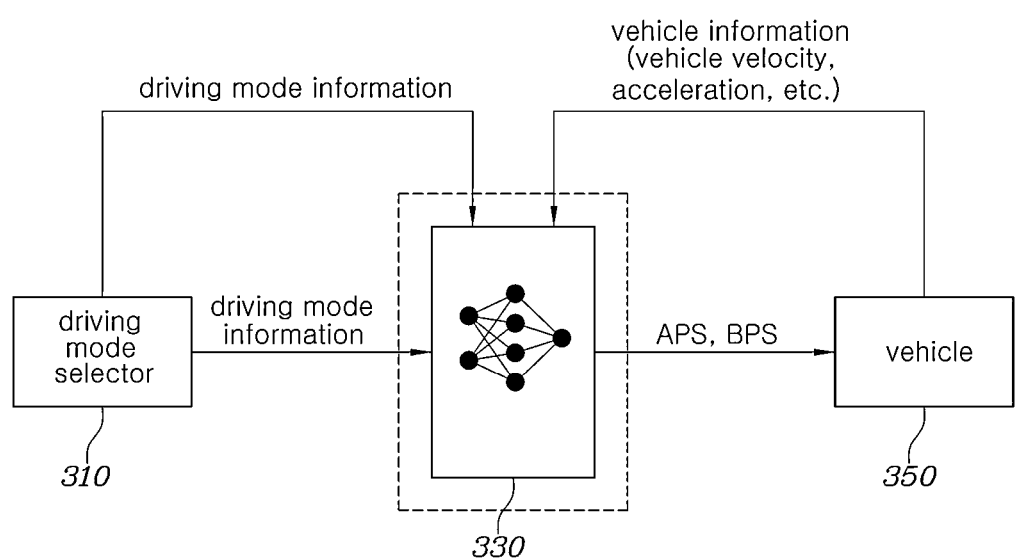
FIG. 3 is a control block diagram of a vehicle control system, according to an embodiment of the present disclosure.

FIG. 3 is a block diagram of a vehicle control system, according to an embodiment of the present disclosure.

With reference to FIG. 3, the vehicle control system according to an embodiment includes a driving mode selector 310, a driver model 330, and a vehicle 370.

The driving mode selector 310 may select a driving mode of the vehicle 370 and may transmit the selection result to the driver model 330. Additionally, the vehicle 370 may transmit vehicle information to the driver model 330.

In an aspect, the vehicle information may include at least one of a velocity or an acceleration of the vehicle 370.

In an aspect, the driver model 330 may be a learned driver model. The driver model 330 may learn in advance a generation pattern of appropriate Accelerator Position Sensor (APS) and Brake Pedal Position Sensor (BPS) command values according to driving mode information and vehicle information. The driver model 330 may generate the ABS and BPS command values using the learned APS and BPS generation pattern, and may transmit the APS and BPS command values to the vehicle 370.

Meanwhile, in order for the driver model 330 to generate appropriate APS and BPS command values, agent learning must be performed in a vehicle simulator environment. In the present specification, an agent refers to a driver model that is created and trained virtually. The agent learns the APS and BPS command values to be output according to the vehicle velocity and the profile target vehicle velocity, and the learned agent performs a fuel efficiency test on behalf of the actual driver. Therefore, the agent at the initial stage of learning and the agent learned several times may generate different APS and BPS command values for the velocity of the same vehicle and the target vehicle velocity of the profile.

Figure 4:
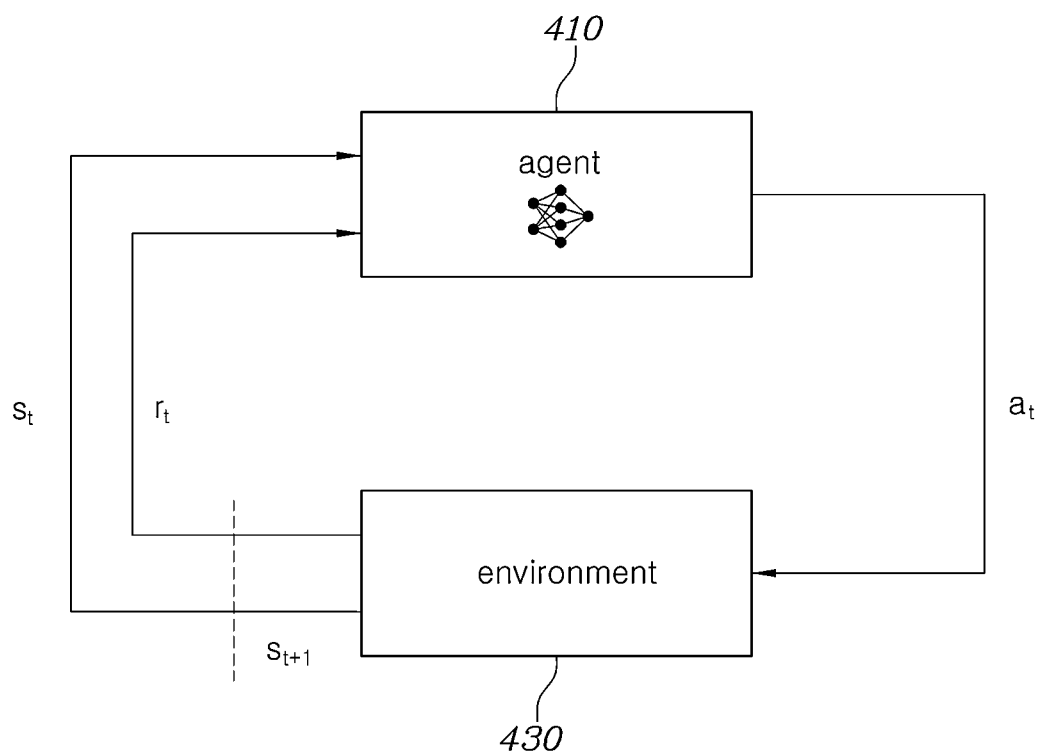
FIG. 4 is a conceptual diagram for explaining the concept of reinforcement learning used in an embodiment of the present disclosure.

FIG. 4 is a conceptual diagram for explaining reinforcement learning of an agent according to an embodiment of the present disclosure. In an aspect, the goal of reinforcement learning is to learn behaviors that can receive as many rewards as possible in a given environment.

With reference to FIG. 4, an agent 410 may perform an action based on a current state of the environment 430 and rewards received from the environment. When the agent 410 performs an action, the state of the environment 430 changes, and the environment 430 generates an appropriate reward according to the action of the agent 410. The agent 410 may reflect the state change value of the environment 430 and the reward received from the environment 430 in the next action.

In FIG. 4, "$s_t$" represents the current state of the environment 430 and $r_t$ represents the reward received from the environment 430. In addition, at represents the action output by the agent 410, and $s_{t+1}$ represents the state of the environment 430 changed by means of the action of the agent 410.

With continued reference to FIG. 4, when the agent 410 performs an action, the state of the environment 430 changes accordingly and generates a reward, and the change in the state of the environment 430 and the reward from the environment 430 may be reflected to the next action of the agent 410.

This concept of reinforcement learning can be applied to a vehicle simulator environment. For example, the agent may be configured to learn a driver model optimized for driving in the driving modes such as FTP-45, HWFET, NEDC, etc. However, there are points that are difficult to implement only through simulation, such as the response velocity, noise, and test environment of the actual vehicle. For this reason, there is a difference between the simulation and the real test environment, which makes it difficult apply the agent learned in the simulation environment alone to actual vehicle tests in which driving is performed in complex driving modes.

In order to solve the above problems, the present disclosure adds a vehicle velocity predictor to the vehicle control system and configures the vehicle control system to reflect a future velocity predicted by the vehicle velocity predictor to the current state ($s_t$) of the environment, which is one of the input signals of the agent.

Figure 5:
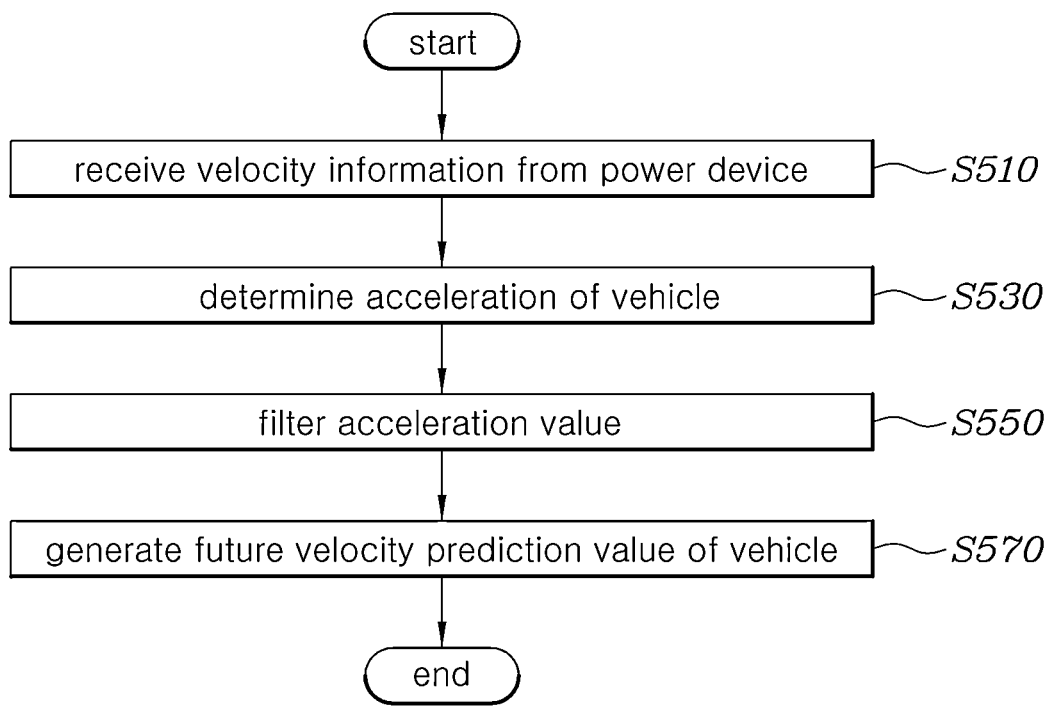
FIG. 5 is a flowchart illustrating a method of predicting a future vehicle velocity by a future vehicle velocity predictor, according to an embodiment of the present disclosure.

FIG. 5 is a flowchart illustrating a method of predicting a future vehicle velocity by a future vehicle velocity predictor according to an embodiment of the present disclosure. In various embodiments, predicting the future vehicle velocity allows a preemptive response operation to be provided ahead of a predetermined time depending on the driving tendency of the driver model to be implemented.

With reference to FIG. 5, at step S510, the vehicle velocity predictor may receive velocity information from a power device. At step S530, the vehicle velocity predictor may determine the acceleration of the vehicle by comparing the current velocity of the vehicle with the velocity of the vehicle a predetermined time before the current time.

In an aspect, the power device may be one of an engine or a motor.

In an aspect, the velocity information and acceleration information received or determined by the vehicle velocity predictor may be velocity information and acceleration information for a time in units of 0.1 seconds from −1.2 seconds to −0.1 seconds from the current time. The vehicle velocity information received from the vehicle velocity predictor may thus be $\{v(t) (e.g., t=-1.2, -1.1, \ldots, -0.1)\}$. Similarly, the acceleration of the vehicle determined by the vehicle velocity predictor may be $\{a(t) (here, t=-1.2, -1.1, \ldots, -0.1)\}$.

At step S550, the vehicle velocity predictor may filter the vehicle acceleration determined at step S530 by passing the vehicle acceleration through a low pass filter, At step S570, the vehicle velocity predictor may generate a prediction value for the future velocity of the vehicle based on the filtered acceleration.

In an aspect, the prediction value for the future velocity of the vehicle may be generated by multiplying the acceleration filtered at step S550 by the predicted time and adding the multiplication result to the current velocity.

Figure 6:
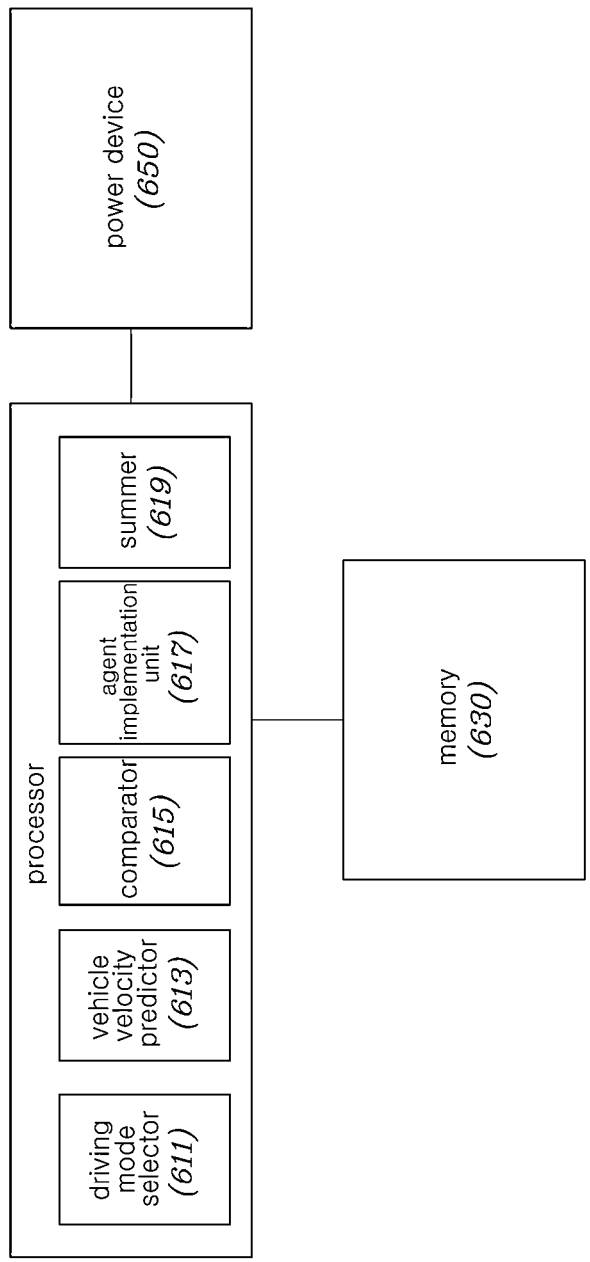
FIG. 6 is a block diagram illustrating a vehicle control system, according to an embodiment of the present disclosure.

FIG. 6 is a block diagram illustrating a vehicle control system, according to an embodiment of the present disclosure.

With reference to FIG. 6, the vehicle control system according to an embodiment includes a processor 610, a storage device 630, and a power device 650.

The processor 610 may be configured to implement a driver model in accordance with the present disclosure.

The processor 610 may include a driving mode selector 611, a vehicle velocity predictor 613, a comparator 615, an agent implementation unit 617, and a summer 619.

The driving mode selector 611 may be configured to receive information on a driving mode to be implemented by the power device 650, and may generate a target velocity value of the power device 650 over time.

In an aspect, the driving mode may be one of a plurality of vehicle velocity profiles.

The driving mode may be, for example, one of FTP-45, HWFET, and NEDC.

In an aspect, the target velocity value of the power device 650 generated by the driving mode selector 611 may be a target velocity value for the future at a predetermined constant time interval from the current time. In addition, a predetermined constant number of target velocity values corresponding to future times with predetermined time interval, starting with the predetermined time interval from the current time. For example, the predetermined constant time interval may be 0.1 second, and the predetermined constant number may be 12. In this example, the target velocity value of the power device 650 that is generated by the driving mode selector 611 may be expressed as $\{y(t), t=1, 2, \ldots, 12\}$, where the interval of t may be in units of 0.1 second.

The vehicle velocity predictor 613 may be configured to generate a prediction value for the future velocity of the power device 650 based on the velocity value received from the power device 650.

In an aspect, the vehicle velocity predictor 613 may generate a prediction value for the future velocity of the power device 650 by the operation method illustrated in FIG. 5.

The comparator 615 may be configured to compare the past target velocity value of the power device 650, generated by the driving mode selector 611, with the actual velocity implemented in the power device 650 to generate a past velocity error value.

In an aspect, the comparator 615 is configured to generate the past velocity error value of the power device 650 by generating a predetermined constant number of past velocity errors corresponding to past times with a predetermined time interval, up to a predetermined constant time interval from the current time. For example, the predetermined constant time interval may be 0.1 second, and the predetermined constant number may be 12. In this example, the past velocity error value generated by the comparator 615 may be expressed as $\{e(t), t=-12, -11, \ldots, -1\}$, where the interval of t may be in units of 0.1 seconds.

The agent implementation unit 617 may learn a driver model that generates APS and BPS values according to the velocity and target velocity values of the power device 650, and may apply the learned driver model to obtain the velocity and target velocity of the power device 650. Therefore, the agent at the initial stage of learning and the agent learned several times may generate different APS and BPS command values for the velocity of the same vehicle and the target vehicle velocity of the profile.

With continued reference to FIG. 6, the agent implementation unit 617 may perform an action using a state and a reward of the environment as inputs. In an aspect, the state, action, and reward for learning of the agent implementation unit 617 may be defined as shown in Table 1 below.

TABLE 1

| State | Past driving velocity (v(t)), past target vehicle velocity (y(t)), past velocity error (e(t)), past APS/BPS (u(t)), Future predicted vehicle velocity ($v_{exp}(t)$), future target vehicle velocity (y(t)) |
|---|---|
| Action | APS/BPS increase or decrease (δu(t)) |
| Reward | Total rewards $-\alpha * RMSE(err) - (1 - \alpha) * (RMSE(err_{exp})$ + signal penalty} |
| | Description RMSE(err): Root Mean Square Error between the past driving vehicle velocity and the past target vehicle velocity |
| | RMSE ($err_{exp}$): Root Mean Square Error between the future predicted vehicle velocity and the future target vehicle velocity |
| | Signal penalty: Penalty is imposed when an APS lower than the cruise APS is output in an acceleration situation (Here, the cruise APS is the APS value that the vehicle can maintain at a constant velocity, and this value varies depending on the vehicle to be tested and thus requires a pre-measurement process) |
| | α: aggression index, the larger the value, the more aggressive the driving pattern |

With reference to Table 1, it is possible to identify that the agent implementation unit 617 may generate an APS/BPS variation based on the past driving vehicle velocity, the past target vehicle velocity, the past velocity error, the past APS/BPS, the future predicted vehicle velocity, the future target vehicle velocity, the type of the test target vehicle, and the aggression index.

Referring still to Table 1, an aggression index a may be defined as an index that determines a relative ratio contributing to satisfying the predetermined goal among the error of the current velocity and the error of the future velocity.

The summer 619 may be configured to generate a current APS/BPS command value by summing the APS/BPS variation generated by the agent implementation unit 617 and the immediately preceding APS/BPS command value, and to transmit the generated APS/BPS command value to the power device 650.

In an aspect, the APS/BPS variation generated by the agent implementation unit 617 is δu(t), the immediately preceding APS/BPS command value is u(t−1), and the current APS/BPS command value is u(t). Accordingly, an equation of u(t)=δu(t)+u(t−1) may be satisfied.

In an aspect, if the u(t) value is a positive number, this may indicate a command value for the APS, and if the u(t) value is a negative number, this may indicate a command value for the BPS.

Although the agent implementation unit 617 and the summer 619 are described as separate components in this embodiment, the function of the summer 619 may be configured to be integrally included in the agent implementation unit 617 such that the agent implementation unit 617 generates the current APS/BPS command value.

Memory 630 may include read-only memory (ROM), random access memory (RAM), flash memory, memory cards, storage media, and/or other storage devices. The memory 630 may store at least one of a state, an action, a reward, or a next state of the agent that can be implemented in the agent implementation unit 617, or a combination thereof.

In addition, the memory 630 may store at least one of a past driving vehicle velocity, a past target vehicle velocity, a past velocity error, a past APS/BPS, a future predicted vehicle velocity, a future target vehicle velocity, a type of a test target vehicle, an aggression index, or APS/BPS variation, or a combination thereof.

The power device 650 may accelerate or decelerate based on the APS/BPS command value received from the summer 619.

In an aspect, the power device 650 may be either an engine or a motor of the vehicle.

In an aspect, the power device 650 may transmit the current velocity to the vehicle velocity predictor 613 and the comparator 615.

Figure 7:
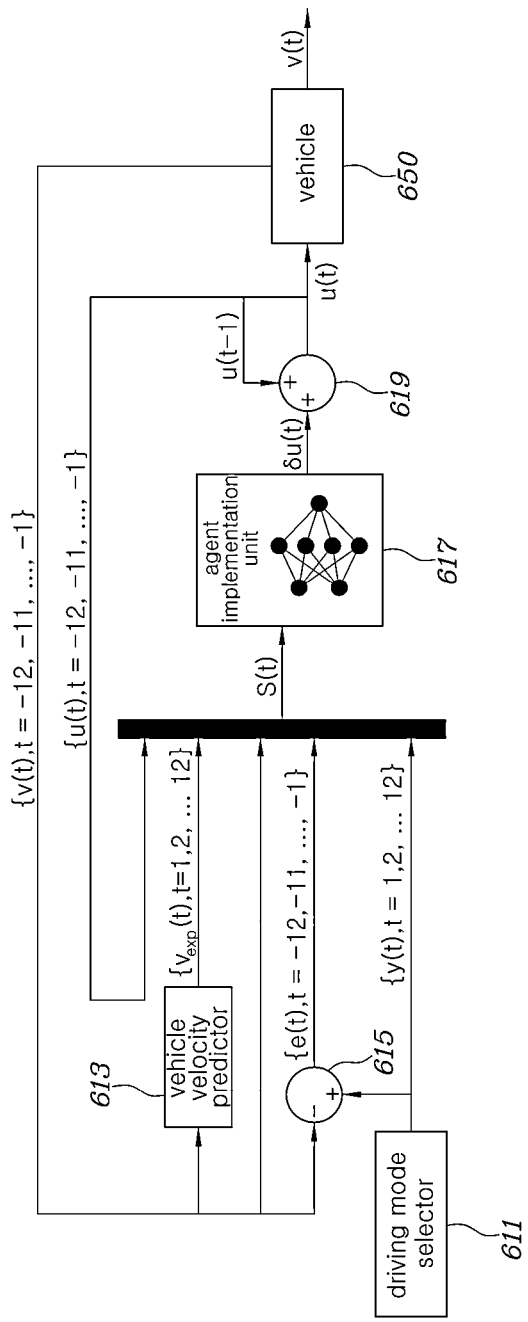
FIG. 7 is a control block diagram of a vehicle control system, according to an embodiment of the present disclosure.

FIG. 7 is a control block diagram of a vehicle control system of FIG. 6, according to an embodiment of the present disclosure.

With reference to FIG. 7, the agent implementation unit 617 may control the acceleration or deceleration of the power device 650 by i) receiving states from the driving mode selector 611, the vehicle velocity predictor 613, the comparator 615, the summer 619, and the power device 650 and ii) generating an APS/BPS variation ($\delta u(t)$) as a result value of an action based on the states.

Figure 8:
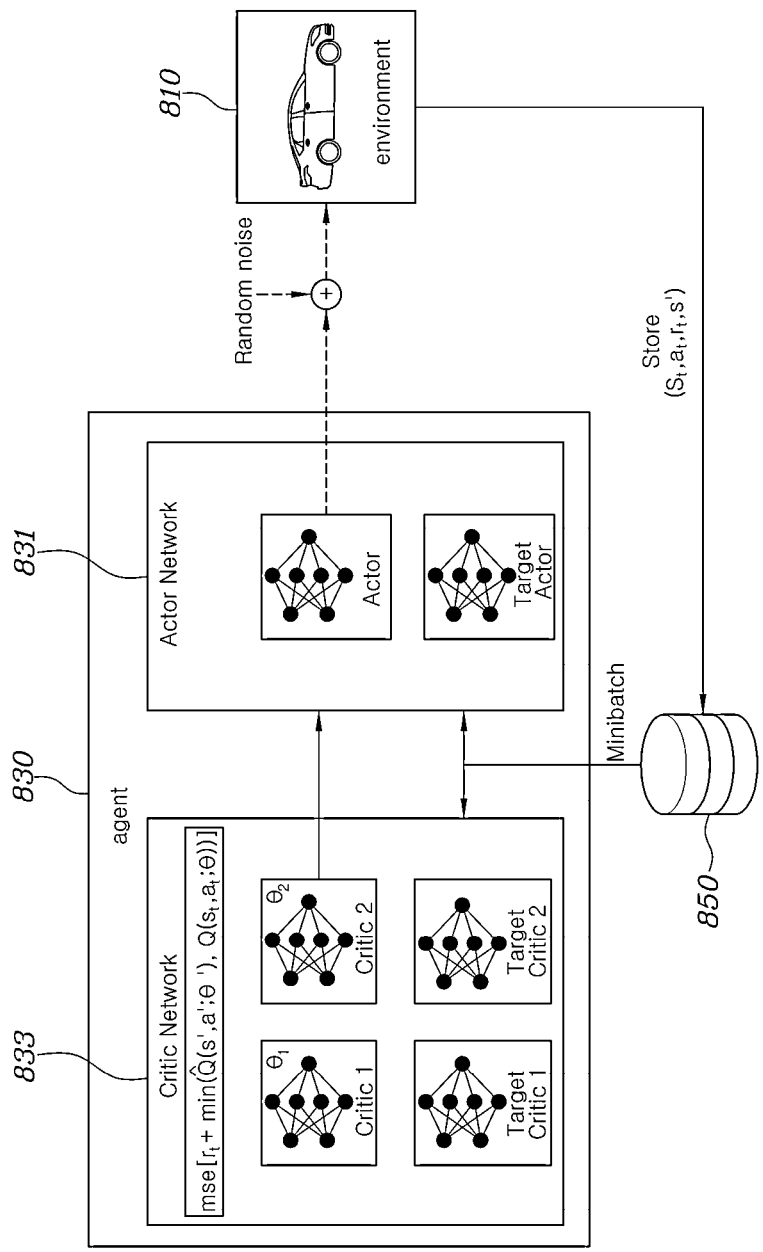
FIG. 8 is a conceptual diagram for explaining the TD3 algorithm used for agent learning, according to an embodiment of the present disclosure.
Figure 9:
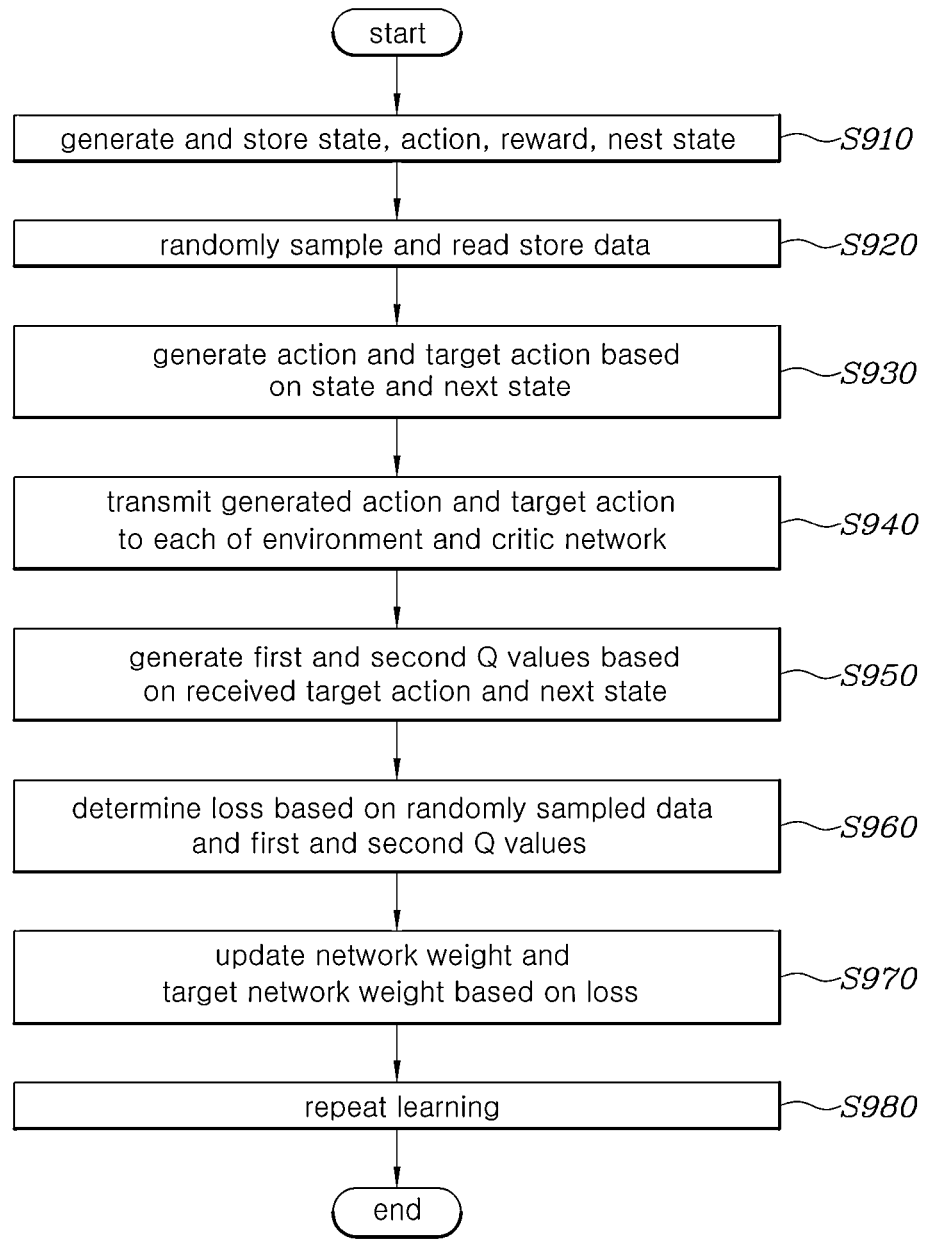
FIG. 9 is a flowchart illustrating a learning method of the TD3 algorithm used for agent learning, according to an embodiment of the present disclosure.

FIG. 8 is a block diagram for implementing the TD3 algorithm used for agent learning according to an embodiment of the present disclosure. FIG. 9 is a flowchart illustrating a learning method of the TD3 algorithm, according to an embodiment of the present disclosure. The learning method may be implemented by a processor and may generate a learned agent as a result of learning.

The TD3 algorithm is a policy-based reinforcement learning algorithm in which learning is performed so that the agent can select the most rewarding action among the actions that can be selected in a specific state.

With reference to FIGS. 8 and 9, the environment 810 and the agent 830 may generate, at step S910, a state, an action, a reward, and a next state through interaction, and may store generated results in a memory 850.

In an aspect, the state, behavior, reward, and next state stored in the memory may be stored in the form of a single bundle of data ($s_t$, $a_t$, $r_t$, s').

In an aspect, the environment 810 and the agent 830 may be virtual objects generated by a processor. The agent 830 may include an actor network 831 and a critic network 833.

In an aspect, the environment 810 may generate the following states and rewards based on the actions received from the agent 830, and these values may be transmitted to the agent 830 via the memory 850. The agent 830 may generate the target behavior based on these values.

In an aspect, random noise may be added to the behavior received by the environment 810 from the agent 830. The environment 810 can remove the random noise to generate the next state and reward.

At step S920, the agent 830 may randomly sample and read data stored in the memory 850.

At step S930, the actor network 811 may generates an action and a target action based on a state read from the memory 850 and a next state. At step S940, the actor network 811 may transmit the generated action and the generated target action to the environment 830 and the critic network 813, respectively.

In an aspect, the target action may be expressed as a'.

In an aspect, the target action may be generated further based on a previously generated or updated target weight.

At step S950, the critic network 813 may generate first and second Q values based on the received target action and the next state.

In an aspect, the first Q value represents the value of the action in the current state, and the second Q value represents the value of the action in the next state.

In an aspect, the first Q value may be generated based on the state, behavior, and network weight, and may be expressed as $Q(s_t, a_t; \theta)$.

In an aspect, the second Q value may be generated based on the target state, the target behavior, and the target network weight, and may be expressed as $\hat{Q}(s', a'; \theta')$.

In an aspect, the first and second Q values may be generated in one critic network. The critic network 813 may include the first and second networks generating respective Q values, for example.

At step 960, the critic networks 813 and 814 may determine a loss based on randomly sampled data and the first and second Q values.

In an aspect, the first and second critic networks 813 and 814 may add the smaller of the first and second Q values to the reward value and may determine a mean squared error of the added value as the loss. The loss can be expressed as mse[$r_t$+min($\hat{Q}(s', a'; \theta')$, $Q(s_t, a_t; \theta)$)].

At step S970, the crit network 813 may update the network weight and the target network weight based on the loss.

In an aspect, the weight and the target weight may be expressed as $\theta$ and $\theta'$, respectively.

At step S980, the critic network 813 may performs learning by repeating steps S910 to S970 several times.

In an aspect, performing steps S910 to S970 once may be defined as performing one episode, and the weight and the target weight may not change significantly in value if, for example, 5 episodes are performed. However, when the episode is performed hundreds of times, the weight and target weight may be changed.

In an aspect, the actor network learned by the TD3 algorithm may serve as the agent implementation unit 617 of the vehicle control system according to an embodiment of the present disclosure.

Figure 10:
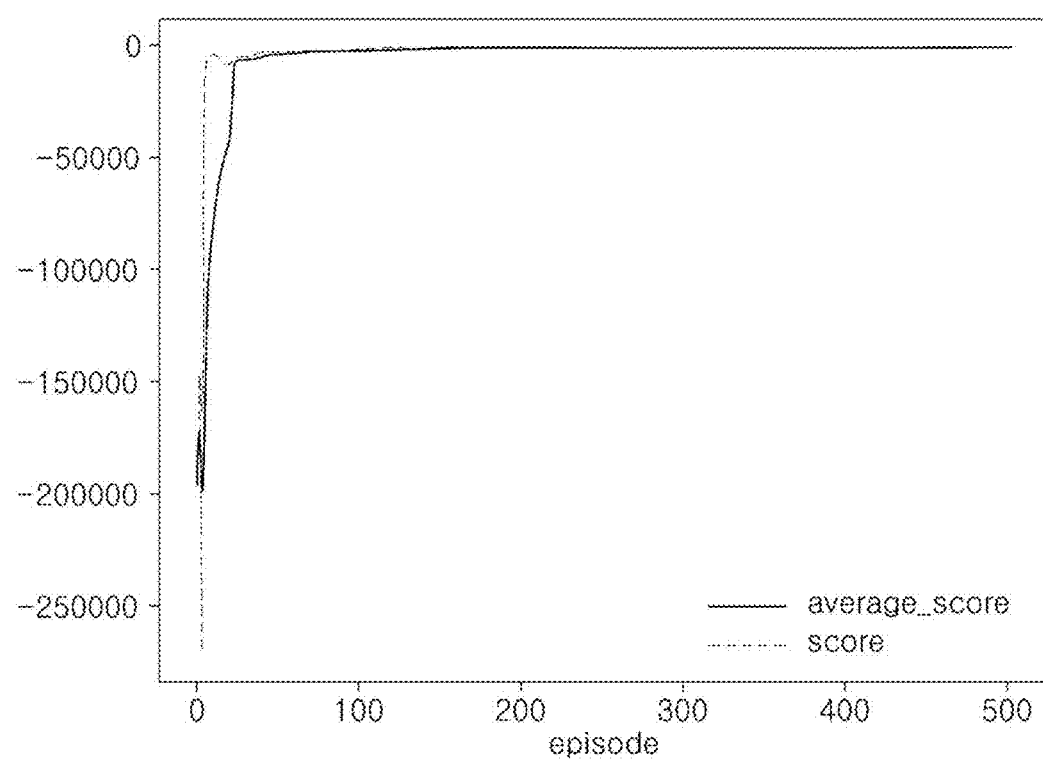
FIG. 10 is a graph showing the correlation between the number of times of learning and the cumulative reward through machine learning, according to an embodiment of the present disclosure.

FIG. 10 is a graph showing the correlation between the number of times of learning and the cumulative reward through machine learning of the present disclosure. In FIG. 10, learning was performed using an FTP cycle. In the graph of FIG. 10, the horizontal axis represents the number of times the learning was performed, and the vertical axis represents the cumulative reward.

With reference to FIG. 10, it is possible to identify that, in the initial stage of learning, the cumulative reward rapidly increases according to the number of times of learning, but when a predetermined number of times is exceeded, the cumulative reward converges to a certain value. In this experiment, the cumulative reward converged on the target value to some extent in the 15$^{th}$ episode.

Figure 11:
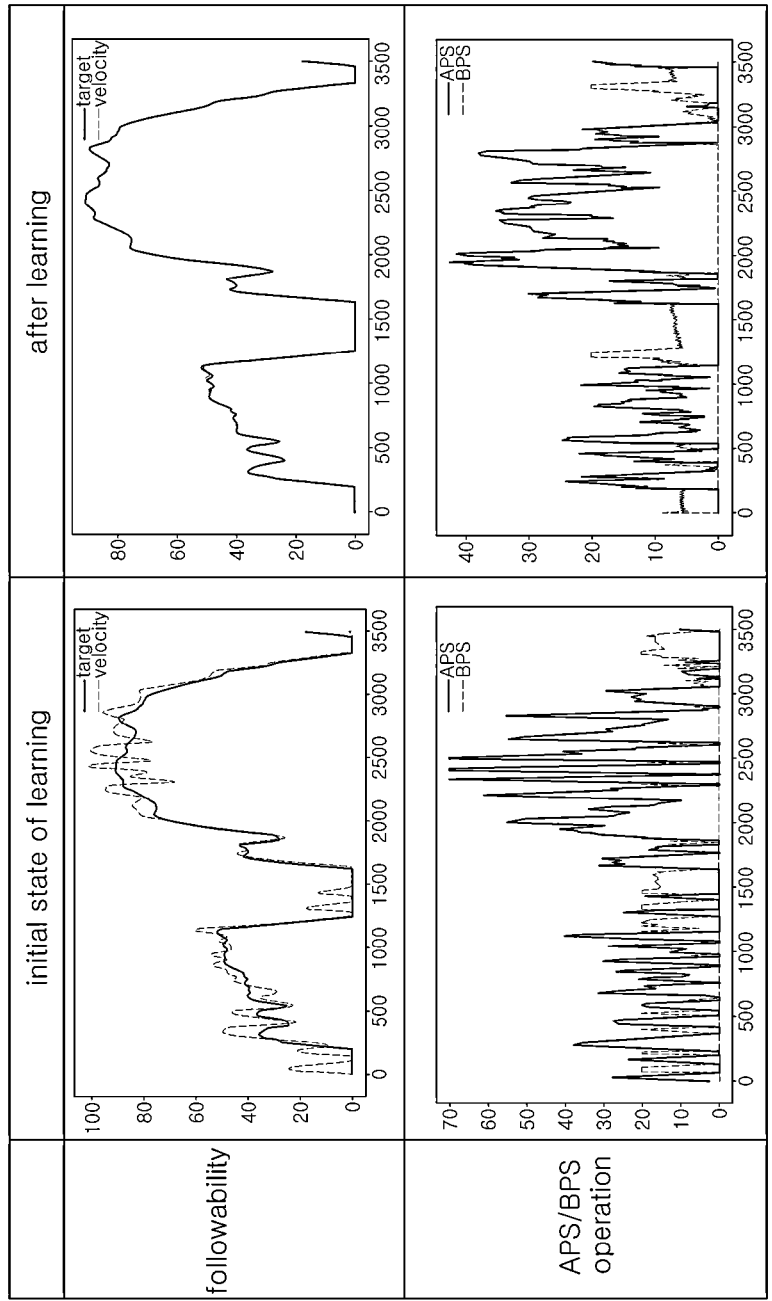
FIG. 11 illustrates graphs showing a comparison of changes in velocity and pedal operation at the beginning and after learning through machine learning, according to an embodiment of the present disclosure.

FIG. 11 illustrates graphs showing a comparison of changes in velocity and pedal operation at the beginning and after learning through machine learning according to an embodiment of the present disclosure.

In FIG. 11, the upper left graph illustrates the difference between the target velocity of the vehicle in the initial stage of learning and the actual implementation velocity, and the lower left graph illustrates the APS/BPS operation implemented at the initial learning stage. In addition, the upper right graph illustrates the difference between the target velocity of the vehicle after learning and the actual implementation velocity, and the lower left graph illustrates the implemented APS/BPS operation after learning.

After achieving a certain level of learning, the agent implemented according to the present disclosure learns of the action to be taken for more rewords in various states during mode driving.

With reference to FIG. 11, it is possible to identify that the error is severe in the initial stage of learning because the APS/BPS pedal is randomly selected for driving but, as the driving mode is learned by appropriate APS/BPS pedal operation, there is little difference between the target velocity of the vehicle and the actual implementation velocity.

Figure 12:
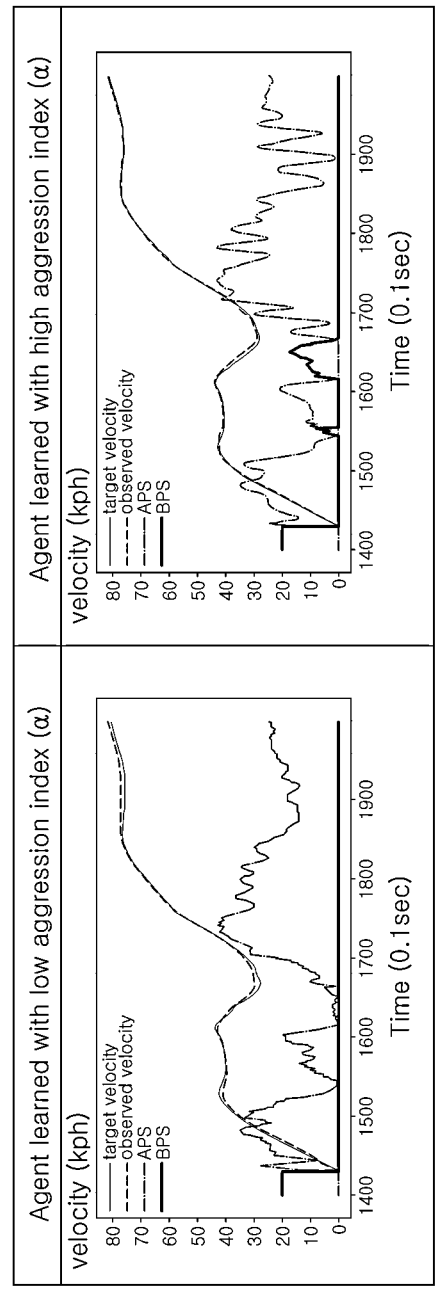
FIG. 12 illustrates graphs showing a comparison between an agent trained with a low aggression index and an agent trained with a high aggression index, according to an embodiment of the present disclosure.

FIG. 12 illustrates graphs showing a comparison between an agent trained with a low aggression index and an agent trained with a high aggression index.

The two graphs of FIG. 12 show result values obtained through the same mode driving by using the agent learned in different methods for the same vehicle model. The graph on the left of FIG. 12 shows the experimental results of driving with an agent learned with a low aggression index ($\alpha=0.3$), and the graph on the right of FIG. 12 shows the experimental results of driving with an agent learned with a high aggression index (($\alpha=0.7$)).

With reference to FIG. 12, it is possible to identify that the agent learned with a low aggression index has a higher tendency to minimize the expected error than the current error, whereas the agent trained with the high aggression index has a high tendency to minimize the current error rather than the expected error in the future. In other words, the aggression index $\alpha$ determines a relative ratio contributing to satisfying the predetermined target between the error of the current velocity and the error of the future velocity.

Considering this point, the agent according to embodiments of the present disclosure can implement various driver propensity models according to the reward design used for agent learning by setting the aggression index to different values.

Figure 13:
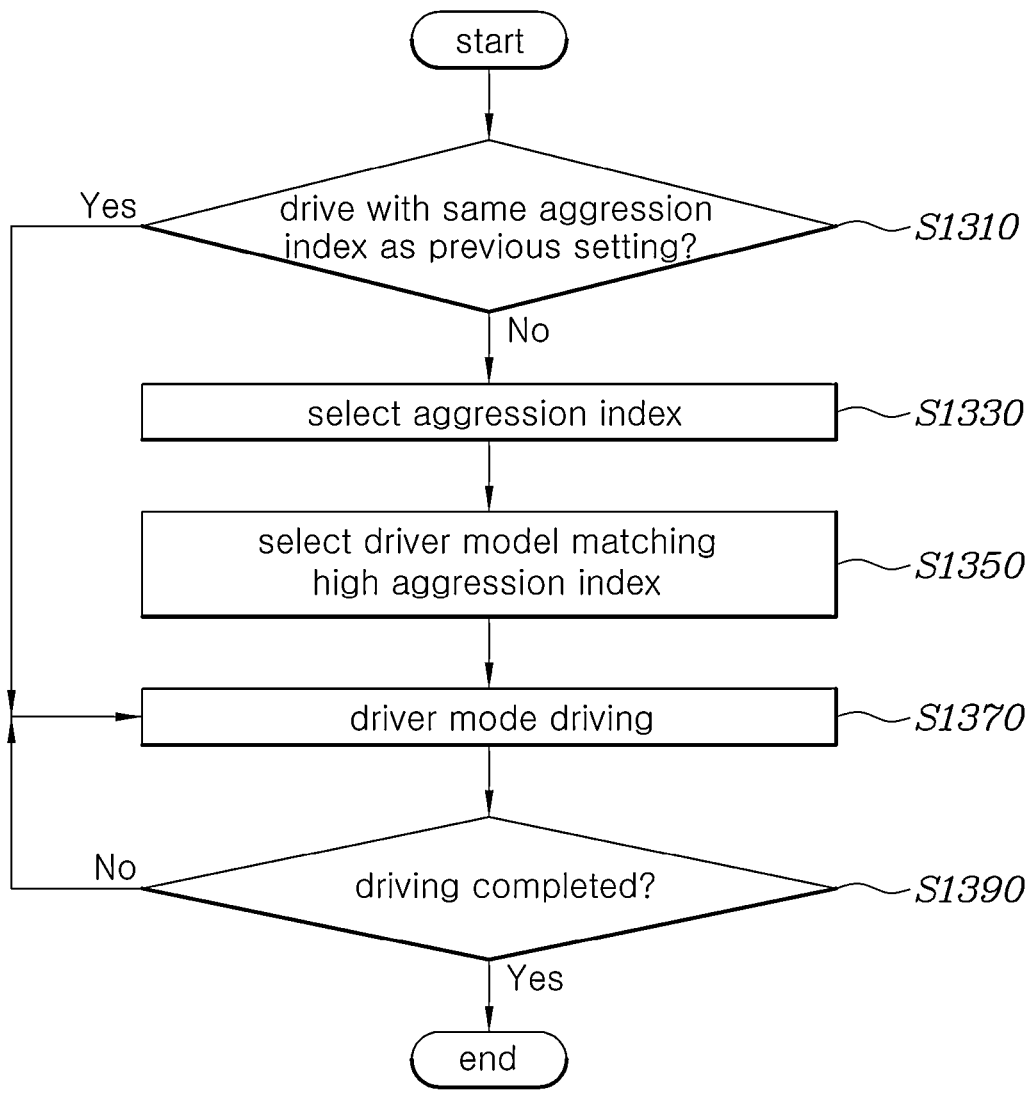
FIG. 13 is a flowchart of a method for operating a vehicle, according to an embodiment of the present disclosure.

FIG. 13 is a flowchart illustrating a method of operating a vehicle, according to an embodiment of the present disclosure.

With reference to FIG. 13, the vehicle may determine, at step S1310, whether to drive with the same aggression index as the previous setting. When the vehicle determines to drive with the same aggression index as the previous setting, the vehicle may perform, at step S1370, driving with the driver model having the set aggression index.

On the other hand, when the vehicle determines at step S1310 not to drive with the same aggression index as the previous setting, the vehicle may select, at step S1330, the aggression index for use in driving and may select, at step S1350, a driver model matching the selected aggression index. At step S1379, the vehicle may perform driving with the selected driver model.

At step S1390, the vehicle may determine whether driving with the selected driver model has been completed. When the vehicle determines at step S1390 that the driving is completed, the vehicle may end the operation. On the other hand, when the vehicle determines at step S1390 that the driving is not completed, the vehicle may continue driving at step S1370.

Figure 14:
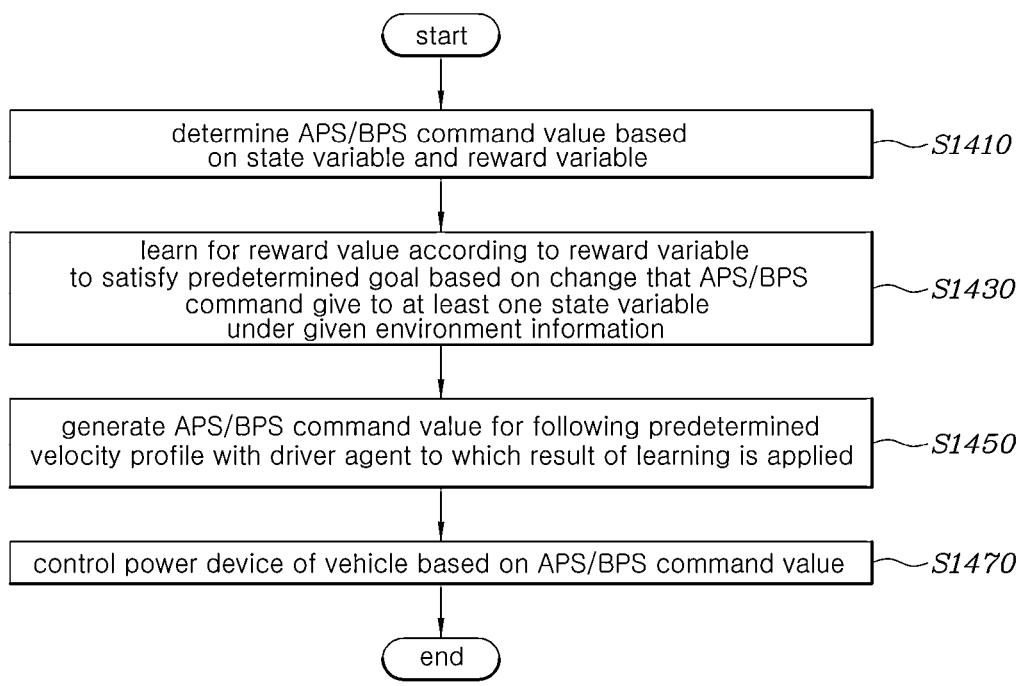
FIG. 14 is a flowchart of a method for controlling a vehicle, according to an embodiment of the present disclosure.

FIG. 14 is a flowchart illustrating a method for controlling a vehicle, according to an embodiment of the present disclosure. The method of FIG. 14 may be performed by a processor or a controller included in the vehicle.

With reference to FIG. 14, the processor may determine the APS/BPS command based on the state variable and the reward variable at step S1410.

In an aspect, the state variable may include a prediction value for the future velocity predicted based on a past APS/BPS command value of the vehicle.

In an aspect, the reward variable may include an index determining a relative ratio contributing to satisfying the predetermined target between the error of the current velocity and the error of the future velocity.

In an aspect, the state variable and the reward variable represent respectively the state and the reward disclosed in FIGS. 4 to 9 and related descriptions of the present disclosure.

In an aspect, the past APS/BPS command value may be a past APS/BPS command value for a predetermined period.

In an aspect, the prediction value for the future velocity of the vehicle may be determined based on information on the past velocity of the vehicle at least two different time points.

In an aspect, the prediction value for the future velocity of the vehicle may be determined based on a value obtained by passing past acceleration information of the vehicle through a low pass filter and the current velocity of the vehicle.

In an aspect, the prediction value for the future velocity may include a prediction value for the future velocity for a predetermined period.

In an aspect, the state variable may further include at least one of a past velocity of the vehicle, an error of an actual velocity with respect to the past target velocity of the vehicle, a target velocity of the vehicle, or a combination thereof.

In an aspect, the target velocity of the vehicle may have different values depending on a driving mode of the vehicle.

In an aspect, the reward variable of the vehicle may be determined based on an aggression index, a root mean square error of the past driving velocity and past target velocity of the vehicle, a root mean square error of the predicted future velocity and future target velocity of the vehicle, and a signal penalty.

In an aspect, the larger the value of the aggression index is, the more aggressive the driving pattern may be.

In an aspect, the signal penalty may have a positive value when the APS/BPS command value generated by the vehicle is lower than the APS/BPS command value for maintaining the vehicle at a constant velocity in a situation where the vehicle is accelerating.

At step S1430, the processor may perform learning so that the reward value according to the rewarding variable satisfies a predetermined target based on the change that the APS/BPS command determined in step S1410 causes to the at least one state variable under the given environment information.

At step S1450, the processor may generate an APS/BPS command value for following a predetermined velocity profile with the driver agent to which the result of the learning is applied.

At step S1470, the processor may control the power device of the vehicle based on the APS/BPS command value.

According to the above-described embodiments of the present disclosure, provided is a driver model automatic learning algorithm capable of outputting optimal APS and BPS values in accordance with mode fuel economy test evaluation modes (e.g., FTP-45, HWFET, and NEDC).

In addition, a control logic capable of flexibly responding to changes in environment and conditions through machine learning using various data such as acceleration, control variable, velocity, and target velocity is implemented.

In addition, the mass production period is shortened, and the test safety is improved by reducing the manpower input when developing vehicle performance.

In addition, it becomes possible to implement different driving modes or different driving propensity models according to the reward design used for agent learning.

What is claimed is:

1. A method for controlling a vehicle, the method comprising:
   determining an accelerator position sensor/brake pedal position sensor (APS/BPS) command value based on a state variable and a reward variable; and
   learning a reward value according to the reward variable to satisfy a predetermined goal based on a change that the determined APS/BPS command value causes to the state variable under given environment information, wherein the state variable includes a prediction value for a future velocity of the vehicle predicted based on a past APS/BPS command value of the vehicle.

2. The method of claim 1, wherein the reward variable comprises an index determining a relative ratio contributing to satisfying the predetermined goal between an error of a current velocity and an error of the future velocity.

3. The method of claim 1, further comprising:
   generating the APS/BPS command value for following a predetermined velocity profile with a driver agent to which a result of learning is applied; and
   controlling a power device of the vehicle based on the APS/BPS command value.

4. The method of claim 1, wherein determining the APS/BPS command value comprises:
   determining an APS/BPS variation based on the state variable and the reward variable, and
   determining the APS/BPS command value based on the APS/BPS variation and the APS/BPS command value at a time point ahead of a predetermined time from a current time point.

5. The method of claim 1, wherein the prediction value for the future velocity of the vehicle is determined based on past velocity information of the vehicle corresponding to at least two different time points.

6. The method of claim 1, wherein the prediction value for the future velocity of the vehicle is determined based on i) a value obtained by passing past acceleration information of the vehicle through a low pass filter and ii) a current velocity of the vehicle.

7. The method of claim 1, wherein the past APS/BPS command value is a past APS/BPS value during a predetermined period.

8. The method of claim 1, wherein the prediction value for the future velocity comprises a prediction value for the future velocity during a predetermined period.

9. The method of claim 1, wherein the state variable comprises at least one of a past velocity of the vehicle, an error of an actual velocity with respect to a past target velocity of the vehicle, or a target velocity of the vehicle.

10. The method of claim 9, wherein the target velocity of the vehicle has different values depending on a driving mode of the vehicle.

11. A system for controlling a vehicle, the system comprising:
    a vehicle velocity predictor configured to generate a prediction value for a future velocity predicted based on a past accelerator position sensor/brake pedal position sensor (APS/BPS) command value of the vehicle; and
    an agent implementation unit configured to:
        determine an APS/BPS command value based on a state variable and a reward variable, and
        learn a reward value according to the reward variable to satisfy a predetermined goal based on a change that the determined APS/BPS command value gives to the state variable under given environment information, wherein the state variable includes a prediction value for a future velocity of the vehicle predicted based on a past APS/BPS command value of the vehicle.

12. The system of claim 11, wherein the reward variable comprises an index determining a relative ratio contributing to satisfying the predetermined goal between an error of a current velocity and an error of the future velocity.

13. The system of claim 11, further comprising a power device controlled based on an APS/BPS command value,
    wherein the agent implementation unit is configured to generate the APS/BPS command value for following a predetermined velocity profile with a driver agent to which a result of learning is applied.

14. The system of claim 11, wherein the agent implementation unit is configured to determine an APS/BPS variation based on the state variable and the reward variable and determines the APS/BPS command value based on the APS/BPS variation and the APS/BPS command value at a time point ahead of a predetermined time from a current time point.

15. The system of claim 11, wherein the prediction value for the future velocity of the vehicle is determined based on past velocity information of the vehicle corresponding to at least two different time points.

16. The system of claim 11, wherein the prediction value for the future velocity of the vehicle is determined based on i) a value obtained by passing past acceleration information of the vehicle through a low pass filter and ii) a current velocity of the vehicle.

17. The system of claim 11, wherein the past APS/BPS command value is a past APS/BPS value during a predetermined period.

18. The system of claim 11, wherein the prediction value for the future velocity comprises a prediction value for the future velocity during a predetermined period.

19. The system of claim 11, wherein the state variable comprises at least one of a past velocity of the vehicle, an error of an actual velocity with respect to a past target velocity of the vehicle, or a target velocity of the vehicle.

20. The system of claim 19, wherein the target velocity of the vehicle has a different value depending on a driving mode of the vehicle.

* * * * *